United States Patent [19]
Bittihn et al.

[11] Patent Number: 5,538,809
[45] Date of Patent: Jul. 23, 1996

[54] AUTOMATIC COUPLING SYSTEM FOR TRACTION BATTERIES

[75] Inventors: Rainer Bittihn, Halver; Friedrich Woeffler, Hagen; Dieter Sziksnus, Wuppertal; Hubert Rinke, Hagen, all of Germany

[73] Assignee: Varta Batterie Aktiengesellschaft, Hanover, Germany

[21] Appl. No.: 506,835

[22] Filed: Jul. 25, 1995

[30] Foreign Application Priority Data

Jul. 29, 1994 [DE] Germany .............. 9412219 U

[51] Int. Cl.$^6$ .............. H01M 2/20; H01M 10/50
[52] U.S. Cl. .............. 429/120; 429/121; 429/123; 320/2
[58] Field of Search .............. 429/121, 123, 429/120, 61, 62, 49; 320/2, 35; 439/374, 378, 504, 577, 460, 919

[56] References Cited

U.S. PATENT DOCUMENTS

| | | |
|---|---|---|
| 5,422,198 | 6/1995 | Lin .............. 429/121 X |
| 5,441,828 | 8/1995 | Akazawa .............. 429/121 |
| 5,484,668 | 1/1996 | Kutz et al. .............. 429/50 |

FOREIGN PATENT DOCUMENTS

| | | |
|---|---|---|
| 031741 | 6/1990 | Germany . |
| 149096 | 2/1992 | Germany . |
| 055242 | 10/1994 | Germany . |

*Primary Examiner*—Anthony Skapars
*Attorney, Agent, or Firm*—Weiser & Associates

[57] ABSTRACT

A coupling for connecting a battery to a battery charger of a replacement station for electric road vehicles equipped with exchangeable batteries receivable upon a roller conveyor associated with the replacement station, or to a battery charger of the owner of the vehicle, includes corresponding terminal strips associated with the battery and with the battery charger having plugs and sockets for electrical connection, and optionally for connection with an air supply and a water refilling device. The plugs and sockets are suitably connected to the battery with cables and hoses. The correspondingly adjusted terminal strip arranged at the charging position in the replacement station is provided with corresponding sockets and plugs, and has additional guide pins for engaging corresponding guide openings in the battery terminal strip. These various structures are automatically connected when the battery is advanced along the roller conveyor.

20 Claims, 2 Drawing Sheets

AUTOMATIC COUPLING SYSTEM FOR TRACTION BATTERIES

BACKGROUND OF THE INVENTION

The present invention generally relates to replaceable batteries for electric road vehicles (i.e., traction batteries), and more particularly, to a system for facilitating the connection of such batteries to a charging device either located at a replacement station (i.e., for "re-fueling") or otherwise operated by the owner of the vehicle.

Despite their undisputed ecological advantages, electric road vehicles still have the significant shortcoming that the batteries for such vehicles require a large storage capacity, even for relatively short excursions. To provide the vehicle with a useful radius of operation, a significant number of very heavy batteries must necessarily be employed.

The use of such vehicles can be made practical with exchangeable batteries, and the construction of battery replacement stations where the spent batteries of a vehicle may be exchanged for charged batteries (on a carry-out basis). To be of practical value, such a battery exchange must occur both quickly and easily. Special techniques are required for this.

One such consideration is that a suitable replacement device is needed for removing the traction battery (either removed battery in storage (for purposes of recharging and maintenance), and for taking a fresh battery (or batteries) from storage, for insertion into the electric vehicle. Since significant weights are involved, and depending on the type of vehicle, different replacement devices often had to be developed for different applications. As an example, compare electric buses and electric transports. For electric buses, battery replenishment is carried out by charging and maintaining the batteries, as a unit. For electric transports, battery replenishment is carried out by moving a service cart between the transport and a fixed charging/maintenance position.

A replacement station for electric road vehicles equipped with exchangeable batteries is disclosed in German (Utility Model) No. DE-Gbm 93 05 542. The disclosed replacement station employs a commercial enclosure having an interior which is divided into a battery room containing a battery replacement device and a room containing a battery charger. The commercial enclosure takes the form of a modular container which is easily transported from one location to the next. An important component of this battery replacement device is a roller belt equipped with telescoping arms which, after opening a roller gate on the container housing, can be unfolded (outwardly) to make a connection with the vehicle. The roller belt is connectable with a roller belt provided in the electric road vehicle, which receives a battery tray. The telescoping arms include appropriate rigging for equalizing small differences in distance between the respective roller belts.

The battery replacement device employs a lifting table, which can be moved along rails in the battery room. The battery is in this way moved to a storage (or charging) position. In this position, the lifting table (with its side facing away from the vehicle) is connected to one of the battery storage racks that occupy the rear of the battery room. The storage racks also have roller belts that are placed in motion during docking of the lifting table.

Following docking of the lifting table, the operator (e.g., the bus driver) then connects a charging plug to a socket associated with the battery, initiating the charging process (as well as automatic water refilling or other service functions, as required). Each charging position has optical displays for indicating the state of the battery charging procedure, including an indication of fully charged, or damaged batteries. The charging position is controlled responsive to corresponding controls and readouts.

When ready for use, the fully charged battery is removed from the battery charger, and from the replacement station. All of the functional procedures involved in removal of the charged battery are the same as the procedures involved in introducing the discharged battery to the replacement station. Only the sequence of operations, and the direction of rotation of the roller belts, is reversed.

Electrical connection between the electrical system of the vehicle, including its motor, and the battery is made with a plug-in coupling. Coupling plugs that can be used in the previously mentioned replacement stations are described, for example, in DE-Gbm 90 03 174 and DE-Gbm 91 14 909.

DE-Gbm 90 03 174 discloses a device for connecting a traction battery (with electrolyte circulation) to a power supply and a compressed gas (electrolyte) source. The device includes an air coupling and an electrical coupling having plug parts and socket parts which are mechanically joined. Both parts can be coupled with the simultaneous production of a pneumatic connection and an electrical connection.

DE-Gbm 91 14 909 discloses a connecting device which includes a plug part (an electrical coupling) which is mechanically connected to a plug part for connection to a water supply and a plug part for connection to an air line, for simultaneously connecting the storage battery to different supply devices (i.e., a battery charger and a source of compressed gas for an electrolyte circulating pump). A mated socket corresponds to the connection plug.

In both instances, a base plate permits the plug and socket parts to be adapted to a combined air/water coupling and a corresponding standard electrical connection. All of the connections can be integrated in a common housing, for the plug part or for the socket part.

However, the plug connections required for the previously mentioned replacement station (for bus batteries), for the orderly charging of such batteries (including charging current, air for acid circulation, water for refilling the cells, water for heating or cooling the batteries, and optional auxiliary contacts), are made by hand. As part of this, the hand plugs must be removed from the fully charged battery (which is to be installed in the vehicle), and then plugged into the used battery removed from the vehicle. On the one hand, such a manual process is subject to the possibility of error. On the other hand, such a manual process tends to introduce delays into the battery replacement process. Moreover, moving through the (extremely crowded) replacement station to manually plug and unplug the necessary connections can soil the user's clothing. As an example, this would be true for uniformed bus drivers who must carry out the battery replacement process during a brief pause in driving.

SUMMARY OF THE INVENTION

It is therefore an object of the present invention to provide a simple, trouble-free connection between a battery and the battery charger and vehicle which are to receive it.

This and other objects are achieved in accordance with the present invention by providing a common strip on the battery which includes connectable parts in the form of plugs or sockets for receiving each of the various supply lines required for operation of the battery. This can include air supply hoses for purposes of electrolyte circulation, hoses for water replenishment, additional lines or hoses for the inflow and outflow of a heating or cooling medium, as well as the necessary current leads. A corresponding strip is provided for the charging station or other charging device, to permit simultaneous connection of the corresponding supply lines. Proper spacing of the connections on the strips ensures that the plug parts mesh precisely in the corresponding socket parts, and are mechanically secured to them. Preferably, the momentum of the battery, as it advances to the charging position along the roller belt, is used to cause automatic coupling of the two strip connectors.

Since the same battery will not always be allocated to a specific charging position during the battery replacement procedures which are to take place, precise alignment of the plug-in strips is ensured by establishing appropriate tolerances between the two connecting parts. For this, the charging strip is preferably mounted with spring elements capable of moving in all directions within a specified tolerance range. This ensures precise positioning with the corresponding terminal strip, responsive to guide pins provided on one of the strips for engaging guide sockets provided on the other strip. For safety and convenience, the sockets for the plug connections are preferably arranged on the terminal strip associated with the battery.

For further discussion regarding the improvements of the present invention, reference is made to the detailed description which is provided below, taken in conjunction with the following illustrations.

DETAILED DESCRIPTION OF A PREFERRED EMBODIMENT

Figure 1:
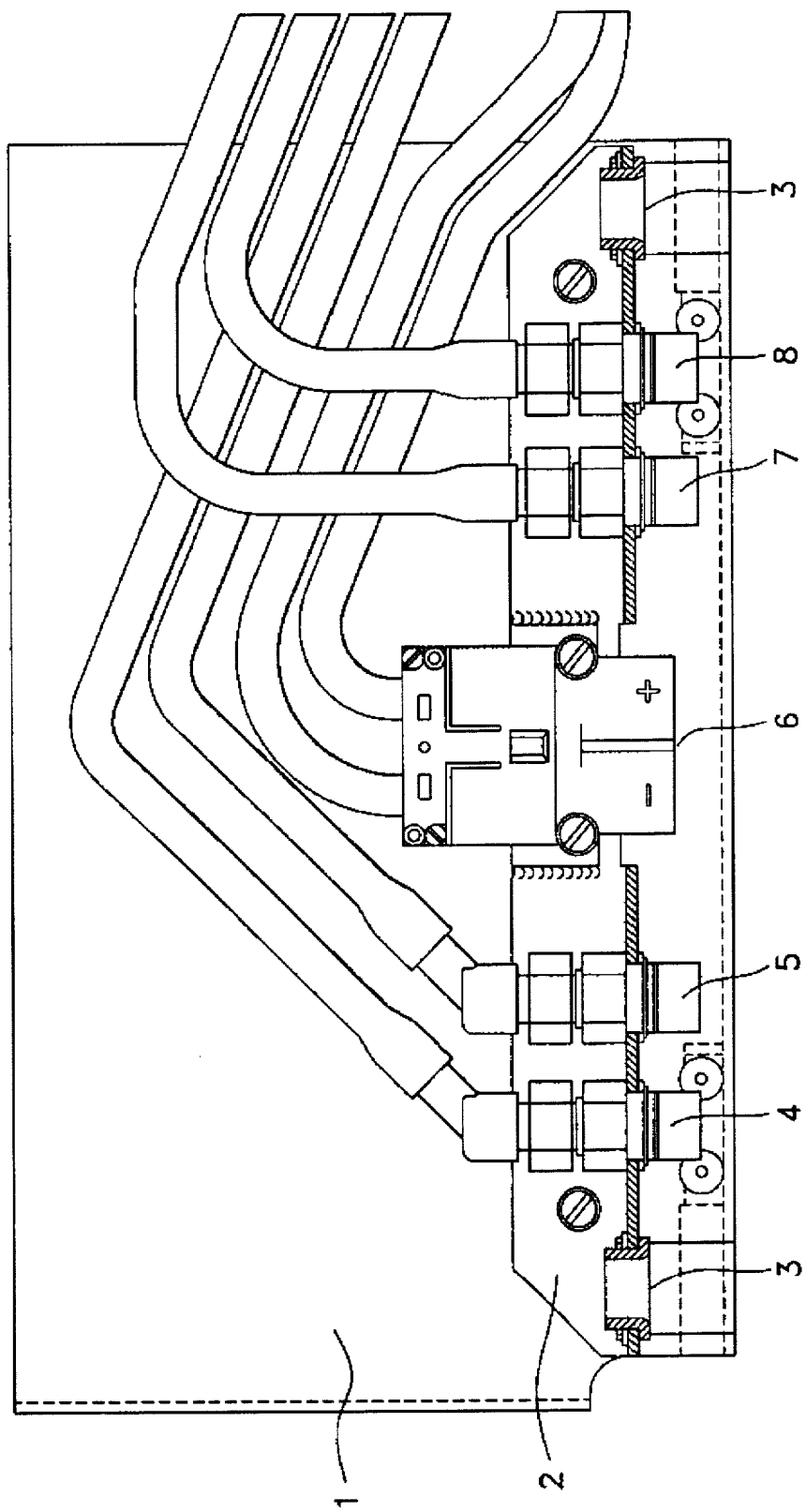
FIG. 1 shows a terminal strip of the present invention, on a battery.

FIG. 1 shows a profile 2 mounted on a support plate 1 attached to a battery (shown in phantom). The profile 2 includes a series of supply connections for communicating with the battery. Since the connections are provided for communicating with a battery, they are preferably implemented as socket parts (for reasons of safety and convenience). The several socket parts include recesses for receiving an air coupling 4, a water coupling 5, an electrical connection 6, as well as connections for receiving a heating or cooling medium (in each case requiring a feed 7 and a return 8). These several connections are separately provided in the profile 2, and are mounted so as to develop a limited amount of play to account for variations in component positioning. The several couplings and connections are joined to the battery with suitable cables or hoses, as shown. A pair of sockets 3 are provided which serve as guides for receiving corresponding plug parts mounted to a profile on the charging device, as follows.

Figure 2:
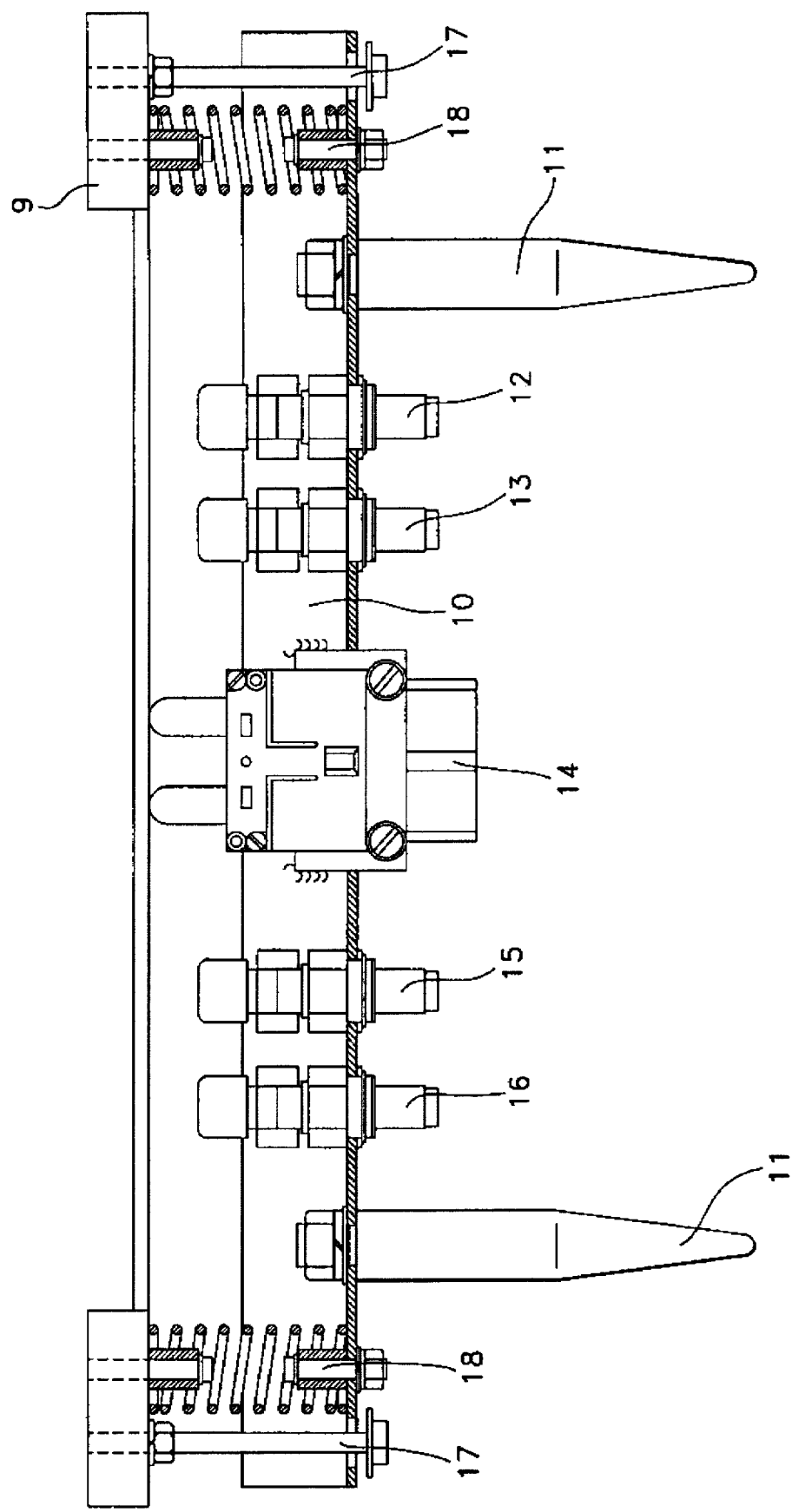
FIG. 2 shows a corresponding terminal strip, for the corresponding battery charger.

FIG. 2 shows a profile 10 mounted on a support plate 9 associated with a battery charger (e.g., in the charging rack or the like). A pair of mounting pins 17 slidingly engage the profile 10 so that the profile 10 can move in all directions on the mounting pins 17. The profile 10 also includes a series of supply connections, which in this case communicate with the battery charger. This includes a plug connection 12 for the air coupling 4, a plug connection 13 for the water coupling 5, a plug part 14 for the electrical connection 6, and plug connections 15, 16 for the feed 7 and return 8 associated with the cooling or heating medium (e.g., water). The compressive forces required to ensure proper contact when the plug parts described in FIGS. 1 and 2 are joined are provided by a pair of springs 18. A pair of guide pins 11 are provided for engaging the guide sockets 3 to correctly position the plug parts relative to their corresponding socket parts.

In order to prevent the escape of air (a blowout) or the emergence of water (a leak) from unjoined or incorrectly joined connections of the strips 1, 10, it is advantageous to provide corresponding plugs and sockets which are self-closing. The previously described automatic plug connection system for battery charging can be used to produce a vehicle/battery connection, or other desired connections, apart from the battery/charger connection described above.

Additional advantages are achieved with the device of the present invention in that commercially available plugs for communicating with traction batteries can be used. This can include auxiliary contacts for temperature measurement, voltage measurement and battery monitoring, if desired. Preferably, an additional terminal strip is mounted on the vehicle, as a counterpiece to the terminal strip on the battery. However, this additional terminal strip is only provided with plug elements for electrical supply, and with any auxiliary contacts necessary for battery monitoring.

It is considered particularly advantageous (for vehicle/battery connection) to mount a second terminal strip on the battery, having the necessary connecting elements for vehicle supply. The second terminal strip is preferably rotated by 180° relative to the terminal strip that is provided for battery charging. This allows the momentum of a battery advancing along the roller belt and into the vehicle to automatically couple with its corresponding terminal strip, without requiring rotation of the battery (which is itself rather voluminous).

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for connecting a battery with a battery charger, including a battery charger at a replacement station for electric road vehicles equipped with exchangeable batteries receivable upon a roller conveyor associated with the replacement station, comprising a first terminal strip attached to the battery and including a plurality of plugs and sockets for electrical and mechanical connection, and a second, correspondingly configured terminal strip associated with the battery charger and including a corresponding plurality of sockets and plugs for electrical and mechanical connection, wherein the first and second terminal strips include guide pins and corresponding guide openings for engagement with one another, and wherein the plugs and sockets of the first and second terminal strips and the guide pins and guide openings of the first and second terminal strips are brought into contact when the battery is advanced into contact with the battery charger.

2. The apparatus of claim 1 which further comprises a corresponding plug and socket for communicating with means for supplying and removing a heating or cooling medium.

3. The apparatus of claim 1 which further comprises a corresponding plug and socket for communicating with a current supply.

4. The apparatus of claim 1 which further comprises a corresponding plug and socket for communicating with a water refilling device.

5. The apparatus of claim 4 which further comprises a corresponding plug and socket for communicating with a compressed air supply.

6. The apparatus of claim 5 wherein the corresponding plugs and sockets are self-closing plugs and sockets.

7. The apparatus of claim 1 which further comprises auxiliary contacts for monitoring an operating parameter of the battery.

8. The apparatus of claim 1 wherein the plugs and sockets of the first terminal strip are variably associated with the plugs and sockets of the second terminal strip to exhibit a limited degree of play.

9. The apparatus of claim 8 wherein at least one terminal strip is spring-mounted to move freely in all directions.

10. The apparatus of claim 1 wherein the battery is provided with an additional terminal strip, for connection to the vehicle.

11. The apparatus of claim 10 wherein the additional terminal strip only has connections for current supply.

12. The apparatus of claim 11 wherein the additional terminal strip further includes connections for auxiliary monitoring means.

13. An apparatus for connecting a battery with a battery charger, including a battery charger at a replacement station for electric road vehicles equipped with exchangeable batteries receivable upon a roller conveyor associated with the replacement station, comprising a first terminal strip attached to the battery and including a plurality of plugs and sockets for electrical and mechanical connection, and a second, correspondingly configured terminal strip associated with the battery charger and including a corresponding plurality of sockets and plugs for electrical and mechanical connection, wherein the first and second terminal strips include guide pins and corresponding guide openings for engagement with one another, wherein the plugs and sockets of the first and second terminal strips combine for communicating with a compressed air supply, a water refilling device and a current supply, and wherein the plugs and sockets of the first and second terminal strips and the guide pins and guide openings of the first and second terminal strips are brought into contact when the battery is advanced into contact with the battery charger.

14. The apparatus of claim 13 which further comprises a corresponding plug and socket for communicating with means for supplying and removing a heating or cooling medium.

15. The apparatus of claim 14 which further comprises auxiliary contacts for monitoring an operating parameter of the battery.

16. The apparatus of claim 13 wherein the plugs and sockets for communicating with the compressed air supply and the water refilling device are self-closing plugs and sockets.

17. The apparatus of claim 13 wherein the plugs and sockets of the first terminal strip are variably associated with the plugs and sockets of the second terminal strip to exhibit a limited degree of play.

18. The apparatus of claim 17 wherein at least one terminal strip is spring-mounted to move freely in all directions.

19. The apparatus of claim 13 wherein the battery is provided with an additional terminal strip, for connection to the vehicle.

20. The apparatus of claim 19 wherein the additional terminal strip is rotated 180 degrees relative to the first terminal strip.

* * * * *